(12) United States Patent
Krasicky et al.

(10) Patent No.: US 11,778,004 B2
(45) Date of Patent: Oct. 3, 2023

(54) DYNAMIC PRESENTATION OF ATTENTIONAL ELEMENTS WITHIN A COMMUNICATION SESSION

(71) Applicant: Zoom Video Communications, Inc., San Jose, CA (US)

(72) Inventors: Kyle William Krasicky, Austin, TX (US); Thanh Le Nguyen, Belle Chasse, LA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/572,574

(22) Filed: Jan. 10, 2022

(65) Prior Publication Data

US 2023/0224343 A1 Jul. 13, 2023

(51) Int. Cl.
*G06F 3/0482* (2013.01)
*H04L 65/403* (2022.01)
*G06F 3/04842* (2022.01)
*G06F 3/16* (2006.01)
*G06F 3/01* (2006.01)

(52) U.S. Cl.
CPC ........ *H04L 65/403* (2013.01); *G06F 3/04842* (2013.01); *G06F 3/016* (2013.01); *G06F 3/16* (2013.01)

(58) Field of Classification Search
CPC .................................................. G06F 3/0482
USPC ....................................................... 715/753
See application file for complete search history.

(56) References Cited

U.S. PATENT DOCUMENTS

| | | | | |
|---|---|---|---|---|
| 10,917,608 | B1* | 2/2021 | Faulkner | G06V 20/41 |
| 11,050,973 | B1* | 6/2021 | Faulkner | H04N 7/152 |
| 11,064,256 | B1* | 7/2021 | Voss | H04N 21/47 |
| 2007/0255154 | A1* | 11/2007 | Lu | A61N 1/36007 600/587 |
| 2007/0255334 | A1* | 11/2007 | Keimel | A61N 1/36007 607/40 |
| 2007/0255337 | A1* | 11/2007 | Lu | A61N 1/36007 607/40 |
| 2014/0085181 | A1* | 3/2014 | Roseway | G06F 3/002 345/156 |
| 2014/0188276 | A1* | 7/2014 | Roseway | A61B 5/165 700/258 |
| 2014/0218537 | A1* | 8/2014 | Nepo | G08B 25/006 340/539.11 |
| 2020/0296327 | A1* | 9/2020 | Karafin | G03H 1/24 |

(Continued)

*Primary Examiner* — Reza Nabi
(74) *Attorney, Agent, or Firm* — Young Basile Hanlon & MacFarlane, P.C.

(57) ABSTRACT

Methods and systems provide for dynamically presenting at least one attentional element within a communication session. The system presents, to each of a number of participants within a communication session, a user interface ("UI") for the communication session. The system receives a signal of an event associated with a first participant intending to communicate with a second participant, with the second participant not acknowledging the intended communication. The system determines, after a predefined period of time, that the intended communication from the first user has not been acknowledged by the second user and that the event has not yet terminated. The system then initiates an attentional element within the UI of the second participant, the attentional element being more pronounced than the notification.

19 Claims, 8 Drawing Sheets

(56) References Cited

U.S. PATENT DOCUMENTS

| | | | |
|---|---|---|---|
| 2021/0058263 A1* | 2/2021 | Fahrendorff | H04L 67/306 |
| 2021/0058264 A1* | 2/2021 | Fahrendorff | H04L 12/1822 |
| 2021/0319408 A1* | 10/2021 | Jorasch | G06Q 10/1095 |
| 2021/0373676 A1* | 12/2021 | Jorasch | A63F 13/213 |
| 2021/0399911 A1* | 12/2021 | Jorasch | H04L 12/1822 |
| 2021/0400142 A1* | 12/2021 | Jorasch | H04M 3/567 |
| 2022/0231873 A1* | 7/2022 | Werfelli | H04L 65/1089 |
| 2022/0400022 A1* | 12/2022 | Desai | G06V 40/107 |

\* cited by examiner

DYNAMIC PRESENTATION OF ATTENTIONAL ELEMENTS WITHIN A COMMUNICATION SESSION

FIELD

The present application relates generally to digital communication, and more particularly, to systems and methods for dynamically presenting one or more attentional elements within a communication session.

SUMMARY

The appended claims may serve as a summary of this application.

BRIEF DESCRIPTION OF THE DRAWINGS

The present disclosure will become better understood from the detailed description and the drawings, wherein.

DETAILED DESCRIPTION OF THE DRAWINGS

Figure 1A:
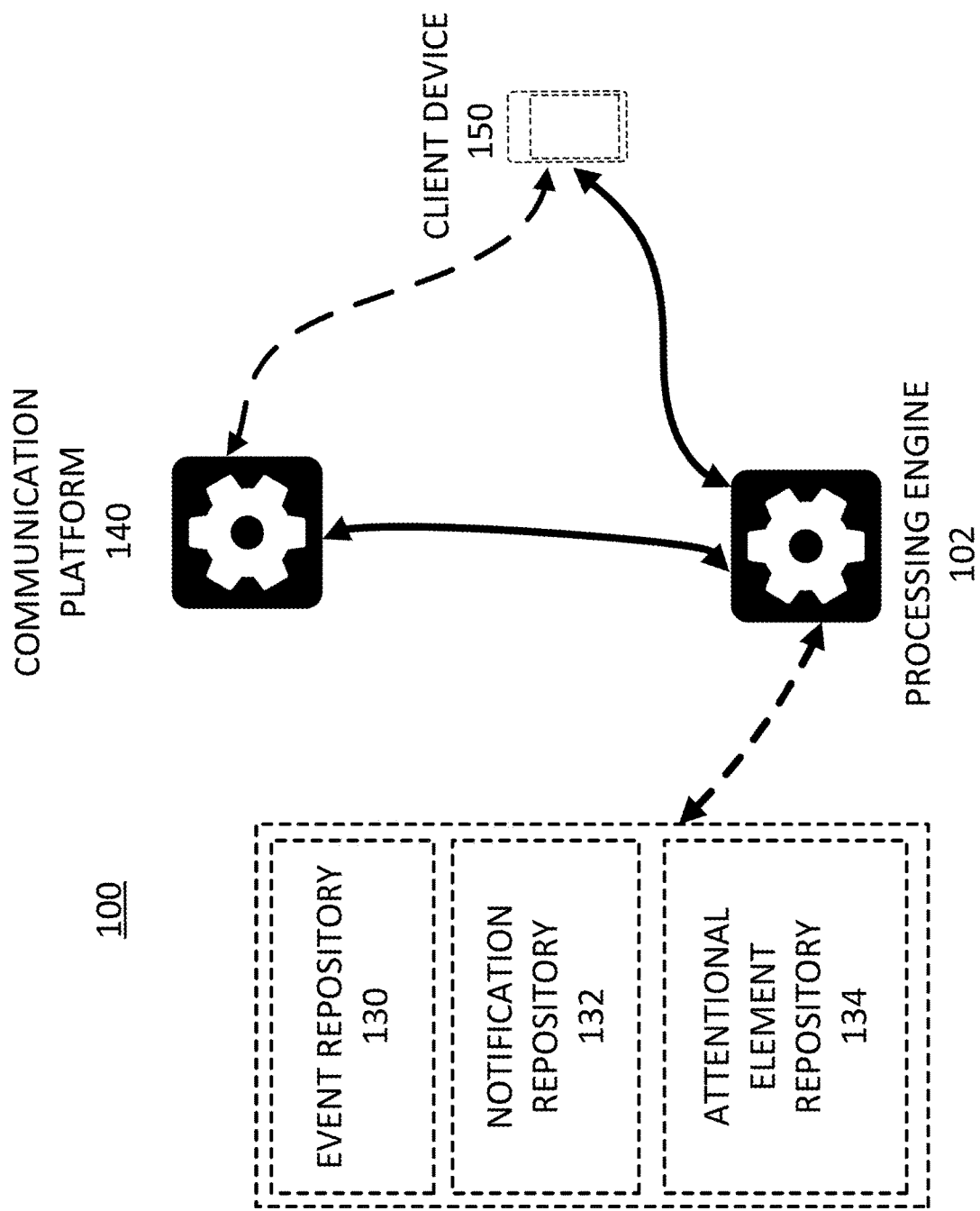
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

During a remote communication session, such as a remote video presentation or discussion, one participant may wish to get the attention of at least one other participant. It is often difficult for the end user, as a participant, to notice when the host or presenter is asking for assistance. For example, during a presentation, the host for the meeting may wish to get the attention of a specific user whom the host would like to have speak on a topic. The specific user may be able to answer a question that an audience member is asking better than the main presenter, in one instance. Asking for that user to speak during the presentation may be disruptive to the presentation that is underway, and the logistics for who should speak or answer a question can be better handled outside of the presentation stream itself. For example, the host may have to repeat themselves several times to get someone's attention, which causes a disruption of the flow of the meeting as well as frustration to the host. In addition, if a user is called upon right then in front of the audience, he or she may get upset that they were not notified ahead of time, and feel they were put "on the spot". Users may also not be prepared to speak when asked, causing embarrassment or a bad impression to a prospective sales client. Such issues can be better addressed outside of the presentation stream itself.

During a typical remote video meeting in a communication platform, there is no ability to provide direct visual alerting during meetings. Chat alerts typically go unseen by participants. Because of this, when a host attempts to send several chat messages to a participant who fails to see those messages, the host becomes frustrated, other participants are upset, and the meeting can become disrupted.

Thus, there is a need in the field of digital communication tools and platforms to create new and useful systems and methods for providing a dynamic presentation of attentional elements within a communication session, such that a participant can be presented with the session's user interface (hereinafter "UI") attempting to get that user's attention in a pronounced way on behalf of another participant wishing to alert or address that person. The inventors have identified an absence in the current field of art of the ability to provide direct visual alerts during meetings which provide pronounced attentional elements, such as the shaking of a window or entire screen, pronounced audio cues, and more.

For example, if a host wants to grab the attention of a participant during a meeting, the host may be able to select the user within a session UI, and hit a "Shake" or "Nudge" UI element. The host may wish to have the user chime in with their thoughts on a topic, or conversely, may wish the user to kindly refrain from speaking too much, without having to explicitly ask during the meeting so as not to disrupt the flow or embarrass the user. The user's window for the session will then, e.g., shake, move, flicker, change color, be maximized to full screen, or otherwise behave in such a way that the participant becomes aware of the host needing their attention. The host can provide notification ahead of time that the attendee will be needed to answer a question in one minute, which can be a valuable amount of time for the attendee to gather their thoughts and think about how to answer the question.

This dynamic presentation of attentional elements can have several benefits. First, it enhances the way users are able to inter-communicate within a meeting, outside of the main channel. This may allow the host to be a more effective communicator with the host's team, and meetings can run much smoother. Second, participants will be given more feedback on when they would need to speak, which can make a big difference to the level of professionalism and quality within a presentation or discussion. For example, the host of a meeting can send a "shake up" or other element to a currently presenting participant to inform them that they are going off-topic and that they should stop talking, thus keeping the meeting on track and on topic. Third both the host and attendees can receive silent, yet effective feedback on performance without a discussion being derailed or criticism being given in front of a presenter's peers. Many other such possibilities may exist to improve the quality of meetings as well as the relationships between participants.

In one embodiment, the system presents, to each of a number of participants within a communication session, a UI for the communication session. The system receives a signal of an event associated with a first participant intending to communicate with a second participant, with the second participant not acknowledging the intended communication. The system determines, after a predefined period of time, that the intended communication from the first user has not been acknowledged by the second user and that the event has not yet terminated. The system then initiates an attentional element within the UI of the second participant, the attentional element being more pronounced than the notification.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., an event repository 130, notification repository 132, and/or an attentional element repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
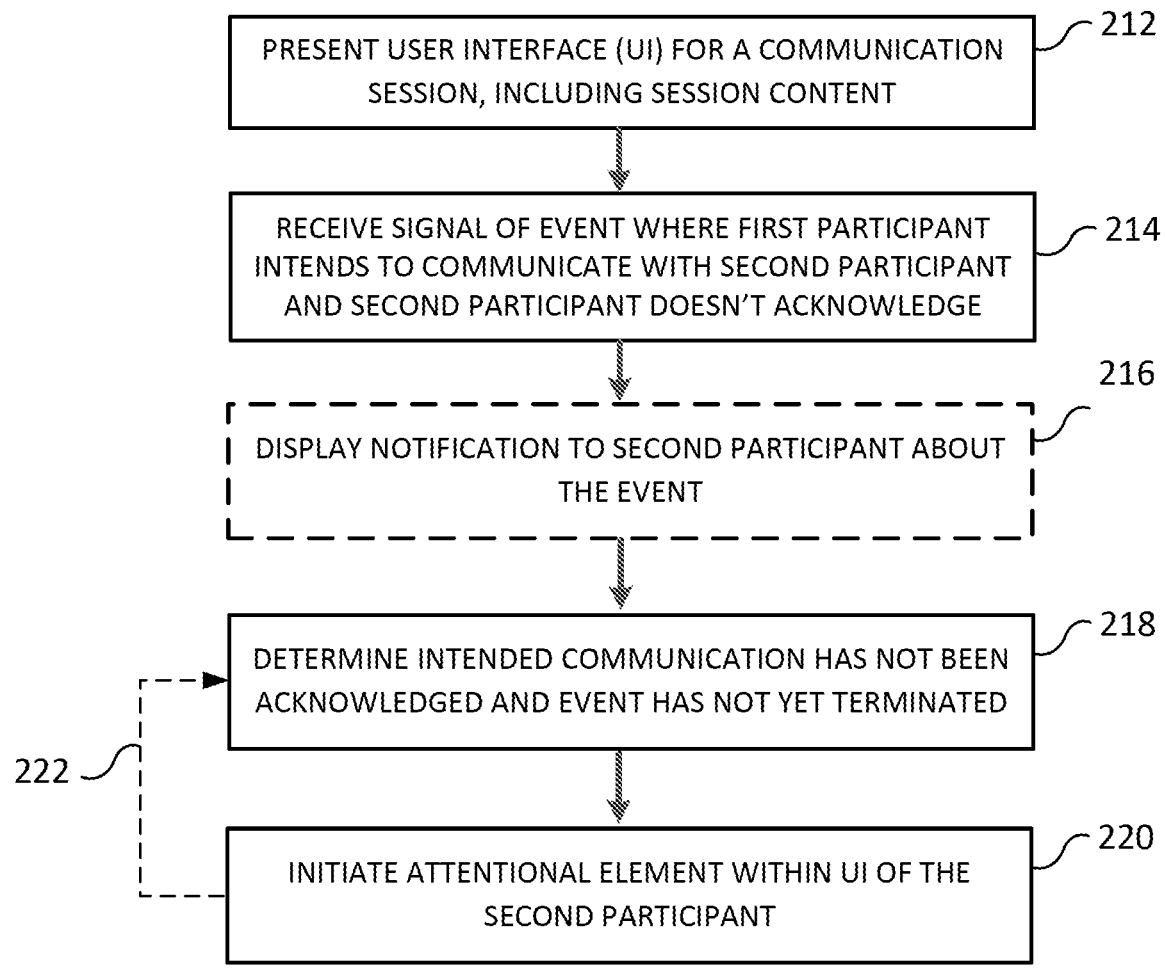
FIG. 2 is a flow chart illustrating an exemplary method that may be performed in some embodiments.

In an embodiment, the processing engine 102 may perform the exemplary method of FIG. 2 or other method herein and, as a result, dynamically present an attentional element within a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include an event repository 130, notification repository 132, and/or attentional element repository 134. The optional repositories function to store and/or maintain, respectively, information on events within the session, particularly UI events of a participant intending to communicate with a second participant; notifications that are generated for participants about events within communication sessions that may be directed towards them; and attentional elements which can be presented to participants via the UI displayed on their client device. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
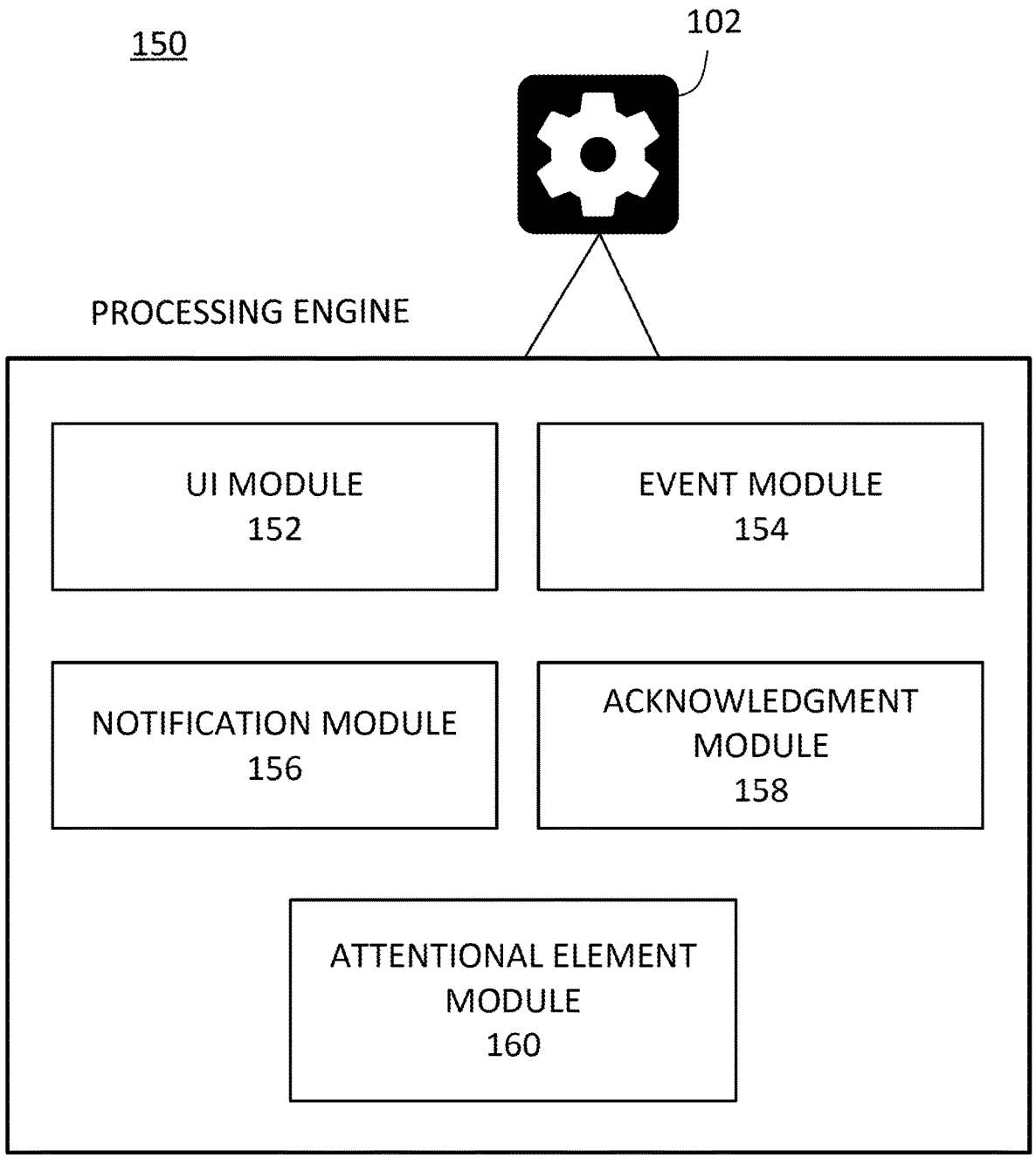
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

UI module 152 functions to present, to each of a number of participants within a communication session, a UI for a communication session. In some embodiments, participant windows, at least some of which contain video feeds of participants, are also included in the UI, as well as UI elements such as attentional elements, as will be described further below.

Event module 154 functions to receive a signal of an event associated with a first participant intending to communicate with a second participant, where the second participant is not acknowledging the intended communication.

Notification module 156 functions to display a notification within the UI of the second participant about the event.

Acknowledgment module 158 functions to determine, after a predefined period of time, whether the intended communication from the first user has been acknowledged by the second user, as well as whether the event has terminated.

Attentional element module 160 functions to initiate an attentional element within the UI of the second participant, with the attentional element being more pronounced than the notification.

The above modules and their functions will be described in further detail in relation to an exemplary method below.

FIG. 2 is a flow chart illustrating an exemplary method that may be performed in some embodiments.

At step 212, the system presents a UI for a communication session. The UI is displayed for each of a number of participants within the communication session, although different participants may be presented with slightly different or customized UIs based on their preferences or other specifics. In some embodiments, the UI includes at least a number of participant windows corresponding to the number of participants, and a video for each of at least a subset of the participants. In some embodiments, the video for a participant is displayed within the corresponding participant window for that participant.

The UI can include session content in a number of potential ways. In some embodiments, the session content is presentation content presented by one or more presenting participants. For example, a presenter can present a number of presentation slides during the communication session. The presenter can also speak as he presents each slide, and potentially appear on video as well. In some embodiments, one or more presenters can present a prepared video while speaking. Other possibilities may include a presenter presenting a document such as a PDF or Word document, a presenter sharing his screen while talking, or a presenter drawing on a virtual whiteboard as he speaks. In some embodiments, rather than one or more presenters presenting material, the session content can include video, audio, or images from a number of participants as they discuss something, or engage in question-and-answer sessions. In some embodiments, audio and/or video streams of the one or more presenting participants can be included. In some embodiments, a portion of a transcript from the communication session can be included. This transcript may be automatically generated during the communication session, then included as session content. Many other such possibilities may be contemplated.

In some embodiments, the system connects participants to a live communication stream via their respective client devices. The communication stream may be any "session" (such as an instance of a video conference, webinar, informal chat session, or any other suitable session) initiated and hosted via the communication platform, for remotely communicating with one or more users of the communication platform, i.e., participants within the communication session. Participants are connected on user devices, and are associated with user accounts within the communication platform.

The UI for the communication session is displayed on the client device of each participant. In some embodiments, the UI appears different for different participants, or has different UI elements included for different participants depending on their user permissions, access levels (e.g., a premium-tier business user account as compared to a free-tier user account), or other aspects that may differentiate one participant from another within the communication platform. In various embodiments, the UI is configured to allow the participant to, e.g., navigate within the video communication session, engage or interact with one or more functional elements within the video communication session, control one or more aspects of the video communication session, and/or configure one or more settings or preferences within the video communication session.

In some embodiments, the system receives a number of video feeds depicting imagery of a number of participants, the video feeds each having multiple video frames. In some embodiments, the video feeds are each generated via an external device, such as, e.g., a video camera or a smartphone with a built-in video camera, and then the video content is transmitted to the system. In some embodiments, the video content is generated within the system, such as on a participant's client device. For example, a participant may be using her smartphone to record video of herself giving a lecture. The video can be generated on the smartphone and then transmitted to the processing system, a local or remote repository, or some other location. In some embodiments, one or more of the video feeds are pre-recorded and are retrieved from local or remote repositories. In various embodiments, the video content can be streaming or broadcasted content, pre-recorded video content, or any other suitable form of video content. The video feeds each have multiple video frames, each of which may be individually or collectively processed by the processing engine of the system.

In some embodiments, the video feeds are received from one or more video cameras connected to a client device associated with each participant. Thus, for example, rather than using a camera built into the client device, an external camera can be used which transmits video to the client device, or some combination of both.

In some embodiments, the participants are users of a communication platform, and are connected remotely within a virtual communication room generated by the communication platform. This virtual communication room may be, e.g., a virtual classroom or lecture hall, a group room, a breakout room for subgroups of a larger group, or any other suitable communication room which can be presented within a communication platform.

In some embodiments, synchronous or asynchronous messaging may be included within the communication session, such that the participants are able to textually "chat with" (i.e., sends messages back and forth between) one another in real time. In some embodiments, a chat window or multiple chat windows may appear which present a list of participants which the user can send messages to; conversations with individual participants or a group of multiple participants; and other suitable windows presenting chat elements. Such elements can appear alongside other UI elements showing video feeds and other aspects of the communication session underway. In some embodiments, the user may be able to click on, e.g., a participant from the list of participants, or one of the video feeds presented and select an option such as "Message this user" to initiate a new chat message with that user.

In some embodiments, the UI includes a number of selectable UI elements. For example, one UI may present selectable UI elements along the bottom of a communication session window, with the UI elements representing options the participant can enable or disable within the video session, settings to configure, and more. For example, UI elements may be present for, e.g., muting or unmuting audio, stopping or starting video of the participant, sharing the participant's screen with other participants, recording the video session, and/or ending the video session.

In some embodiments, one or more UI elements may be present for getting the attention of at least one other participant. For example, upon the user selecting a UI element representing another participant, a button or submenu option may appear within the UI that reads "Shake", "Get User's Attention", or similar. Upon the user clicking on the button or otherwise interacting with it, the system may proceed to a next step to process the request to get the user's attention, as will be described in further detail below. An example of a UI element for taking a note will be discussed below with respect to FIG. 3.

In some embodiments, at least a portion of the UI displays a number of participant windows. The participant windows correspond to the multiple participants in the video communication session. Each participant is connected to the video communication session via a client device. In some embodiments, the participant window may include video, such as, e.g., video of the participant or some representation of the participant, a room the participant is in or virtual background, and/or some other visuals the participant may wish to share (e.g., a document, image, animation, or other visuals). In some embodiments, the participant's name (e.g., real name or chosen username) may appear in the participant window as well. One or more participant windows may be hidden within the UI, and selectable to be displayed at the user's discretion. Various configurations of the participant windows may be selectable by the user (e.g., a square grid of participant windows, a line of participant windows, or a single participant window). In some embodiments, the participant windows are arranged in a specific way according to one or more criteria, such as, e.g., current or most recent verbal participation, host status, level of engagement, and any other suitable criteria for arranging participant windows. Some participant windows may not contain any video, for example, if a participant has disabled video or does not have a connected video camera device (e.g. a built-in camera within a computer or smartphone, or an external camera device connected to a computer).

At step 214, the system receives a signal of an event associated with a first participant intending to communicate with a second participant, with the second participant not acknowledging the intended communication. Depending on various embodiments, an event which is intended by a participant to communicate with another participant can potentially take many forms, depending on the possibilities for communication within the communication session between participants. For example, in some embodiments, a "Shake", "Get Attention", or similar UI element may be selected with respect to that receiving participant. In some embodiments, a user sending a chat message to a fellow participant may similarly be considered an event. In some embodiments, a special event may be triggered by a user sending multiple messages within a given time frame (i.e., X number of messages within a given time frame) which the receiving participant does not respond to or otherwise acknowledge.

In some embodiments, a user may raise their hand, which is an action that is visible on their video feed, while another participant is speaking, indicating an intention to be called upon by that speaking participant, an intention for the speaking participant to stop speaking, or similar intention related to getting the participant's attention. In the case of such a nonverbal signal provided and visible via the video feed of a user, the system may receive a signal of the event via a machine learning (hereinafter "ML") model, machine vision model, or similar artificial intelligence (hereinafter "AI") model which recognizes, to a certain degree of certainty, that a user is attempting to give a visual signal to another participant within the video feed. Such an AI model can be trained on other meetings with one or both of these participants, other meeting from other participants sending visual signals, or other suitable training data.

In some embodiments, a UI element may be presented to users such as "Raise hand" or similar. Upon a user selecting such an element, a speaking presenter may be notified that the user in question has virtually "raised their hand" to indicate that they wish to be called upon or otherwise get the attention of the speaking presenter.

The system can determine that a recipient participant does not acknowledge the intended communication in a number of ways. In the case of the event being a chat message being sent from one user to another, for example, various embodiments may determine that the chat message has gone unacknowledged in different ways. For example, in various embodiments, the system can determine a lack of acknowledgment if the intended recipient does not successfully receive the message; does not see or click on the message even though it is successfully received; does not see or click on a notification related to the message; sees or clicks on a message or a notification of a message, but does not respond or perform other action indicating acknowledgment; or any other suitable way of not acknowledging a communication. Similar such criteria can exist for other forms of communication. For example, if a nonverbal indication is given on a video feed, such as a user raising their hand while another user is talking or presenting, lack of acknowledgment may include the speaking or presenting user not calling on the other presenter, not stopping or interrupting the presentation, not sending a chat message to the user in response within a certain window of time; or any other suitable indication of lack of acknowledgment.

In various embodiments, the second, receiving participant may be one or more of: a host or administrator of the communication session, a presenter, or a participant with one or more granted permissions to receive attentional elements within the communication session. Some users may customize their session preferences to not receive attentional elements, for example, or a host of a meeting may prohibit attentional elements from being displayed during the meeting. Others may customize preferences to specifically request attentional elements to be displayed for a specific user or users, a specific meeting, or all meetings.

In some embodiments, concurrently to or after receiving the signal of the event, the system can receive signals of one or more additional events each associated with the first participant intending to communicate with a different additional participant (i.e., different from the second participant or from one another). In such event(s), each event is handled separately with respect to the remaining steps of the method. In various embodiments, the events may be handled concurrently, in sequential order according to when the signal of the event was received, or in some combination of both.

In some embodiments, at optional step 216, upon receiving the signal of the event, the system displays a notification within the UI of the second participant about the event. In various embodiments, a notification can take a variety of forms. For example, upon a user raising their physical hand or selecting a "raise hand" UI element or other UI element simulating a reaction, the system may display, at the recipient user's UI, an icon notifying the recipient user than the user's hand was raised in the feed or virtual hand was raised, or may simply read that the user has something to say or that the presenter may wish to call upon that user. In some embodiments, rather than an icon, some other element can appear such as, e.g., a window, push notification, pop notification, or a modification of an existing UI element's appearance (such as a number "1" or an exclamation mark appearing for a UI element, indicating there is some new aspect of the UI element the user can explore). This notification may serve as an initial, standard, non-pronounced element to signal an event to a recipient user. In some embodiments, this notification can appear as a first stage of attentional element before other, more pronounced attentional element(s) are displayed in future steps of this method.

At step 218, the system determines, after a predefined period of time, that the intended communication from the first user has not been acknowledged by the second user and that the event has not yet terminated.

In some embodiments, the predefined period of time is any default period of time which can be given for a period in which the recipient user has not acknowledged the communication. For example, the predefined period of time may be, e.g., 5 seconds, 10 seconds, or 15 seconds. In some embodiments, the predefined period of time may be customized or selected by one or more hosts or presenters of the meeting. In some embodiments, each participant may be able to select their preferred period of time by which they expect a user to acknowledge an intended communication to that user. In some embodiments, the predefined period of time may be dynamically determined based on one or more contextual pieces of information regarding the nature of the intended communication, a predicted intention of the communication, or other criteria. For example, if the system predicts that the intention is to urgently tell a team member to answer a client's question immediately, then the period of time may be predetermined to be a short period, such as 5 seconds or less. In various embodiments, such dynamic determination may be made using ML, machine vision, and/or other AI models, and may be made using various pieces of information such as, e.g., generated transcript(s) of the session which are produced in real-time, video feeds and audio feeds of participants, recognition of facial expressions and other ways of determining sentiment and intention of participants in a meeting, and any other suitable ways of dynamically determining a period of time for whether a user acknowledges a given intended communication. In some embodiments, the predefined period of time passes after a notification is displayed, in the context where a notification is displayed for an event.

In determining whether an event has terminated, e.g., an intended communication from one user to another no longer is intended or is otherwise no longer applicable, a variety of criteria can be used. For example, if a user has selected a "Shake" UI element with respect to another user, the user may change their mind and select a "cancel" UI element that pops up. This would be recognized by the system as a termination of the event. If a user physically raises their hand in a video feed, but then puts their hand down, the system may recognize it as a termination of the event. If the meeting itself ends, or either the sending or receiving user leaves the session, the intended communication event can also be terminated. If a chat message is sent, an "undo" button being selected may unsend the message, thus triggering a termination of the event. Many other such possibilities can be contemplated for different events and forms of communication.

In some embodiments where signals of additional events have been received concurrently or after the first event, for each additional event the signal determines, after a predefined period of time, that the intended communication from the first participant has not been acknowledged by the additional participant associated with the additional event, and that the additional event has not yet terminated, and then initiates an additional attentional element within the UI of the additional participant associated with the additional event. This may occur concurrently, in sequential order according to when the signal of the additional event was received, or in some combination of the two.

At step 220, the system initiates an attentional element within the UI of the second participant.

An attentional element may be any UI element or UI behavior, such as a behavior, action, or appearance of an existing UI element, a new UI element being displayed, an audio or visual cue appearing, a maximizing or minimizing of one or more UI windows or elements, or any other element or behavior presented to a user during a communication session. An attentional element may be, for example, a UI window or entire UI screen shaking within the UI; a physical client device the user is using to connect to the session undergoing some event, such as the device vibrating, emitting audio, presenting tactile feedback to the user, or similar; one or more UI elements changing color, flashing, flickering, or blinking; one or more UI elements moving around or changing position, or appearing overlapping in front of other UI elements; one or more UI elements changing appearance; one or more new UI windows or screens appearing before the user; existing UI elements or windows changing color or alternating between different colors; one or more attentional audio cues being audible by the user; one or more external devices giving physical, visual, or audio feedback to the user; or any other suitable form of attention-based elements or behaviors within the content of a user at a device accessing a communication session.

In some embodiments, the system optionally receives one or more pieces of information about a client device associated with the second participant, specifically the client device being used by the second participant to view the UI of the communication session. A list of available attentional elements for that device is generated based on the information about the client device. The system then selects from the list of attentional elements available for the client device. For example, if the system determines that a client device does not have any vibration features, then the generated list will not include vibration, and vibration can therefore not be selected as an attentional element. Conversely, if a device can give tactile feedback to the user, such as a feeling of a bump on a trackpad the user is making use of, then this may appear as an attentional element which can be selected. If the client device is detected to have speakers attached, audio can play from those speakers. In this way, attentional elements can be hardware-dependent and generated based on the device and/or display actually used by the recipient user.

In some embodiments, the system can determine that the first participant and the second participant both belong the same organization, and can then determine one or more attentional elements to initiate from a list of attentional elements based on the organizational (and hierarchical, if relevant) relationship between the first and second participant within that organization. In some embodiments, the system can receive or retrieve from database(s) one or more of: information relating to the members of an organization, information relating to a specific member and which organization (if any) they are employed with, information related to relationships between members of the organization, and/or information related to the first and second participants and what organizational relationship exists between them, if any. Such information can be used in whole or in part to make the determinations as to the first and second participants and their specific relationship, and which attentional element to select from based on that relationship. In some embodiments, a more pronounced attentional element may appear for an employee when a boss or manager is attempting to get the attention of that employee. In one example, a chat window may merely flicker for two coworkers in the same department, but may shake with a vibrational element on the device when a department head is trying to get the attention of one of his team members. In another example, attentional elements may appear between two employees of an organization who are in the same department or team (such as, e.g., two members of a sales team working on presenting a product to a prospective customer), but no other participants within a given meeting.

In some embodiments where a notification was first sent prior to the attentional element being initiated, the attentional element may be more pronounced than the notification, in order to provide an escalation between the standard notification and the more pronounced attentional element.

In some embodiments, once this attentional element is initiated or provided, the system completes the steps of the method. In some other embodiments, the system performs optional step 222 by returning to step 218. The system, at step 218, once again determines whether the intended communication has been acknowledged and whether the event has been terminated or not. If the communication has been acknowledged after a predefined period of time, then the steps are completed. If the event has terminated, then the steps are completed. In some embodiments, if the event has terminated or the communication has been acknowledged, the system terminates presentation of any existing notifications and attentional elements with respect to the event, and refrains from any further determination or initiation of attentional elements with respect to that specific event. If the communication is still unacknowledged and the event has not yet terminated, then the system may optionally proceed with initiating an additional attentional element. In some embodiments, this additional attentional element is more pronounced than the previous attentional element. That is, it may be more attention-getting than the previous attentional element, such as by being, e.g., more visible, more audible, presenting shaking or vibrating with a higher intensity or higher degree than before, etc. In some embodiments, this cycle of determining and sending attentional elements can complete for a certain specified number of iterations before stopping any further attempts, or may keep repeating in some form or another until an acknowledgment is given.

In some embodiments, the additional attentional element may be of a different modality than the attentional element. For example, if the first attentional element was visual in nature, the second attentional element may be an audio cue, such as a ringing or beeping sound to alert the attention of the recipient in a different way.

In some embodiments, any of the UIs described, including, e.g., the communication session UI, attentional elements or behaviors, or UI elements may include one or more mixed reality elements that can be displayed in mixed reality format on a client device. In one example, a user may see a 360-degree view within a communication session UI, with video feeds appearing in different locations within that view. A user may be able to select one or more video feeds to attempt to send a communication to in this 360-degree view. Similarly, attentional elements or behaviors may involve special spatial or immersive elements which may be provided with mixed reality features.

In some embodiments, during a prespecified window of time before or after receiving the event, the system may receive an additional event associated with a third participant intending to communicate with the second participant. The system then generates a queue comprising the first participant and the third participant for determining a priority order for initiating attentional elements. For example, if one user raises their hand, then another raises their hand after, and the presenter does not acknowledge either, the presenter may be presented with a notification showing who raised their hand first, attentional elements may first be generated with respect to the first participant, then third participant.

In various embodiments, such a queue may be ordered by one or more of, e.g.: a first event signal received, and participant with the highest priority ranking with respect to the communication session or the second participant. In some embodiments, the system receives one or more modifications to the queue. These modifications can include one or more of, e.g.,: a request for a participant to be removed from the queue, a request for a reordering of one or more queue elements, and a request for adding a participant to the queue. The one or more modifications to the queue are then initiated.

Figure 3:
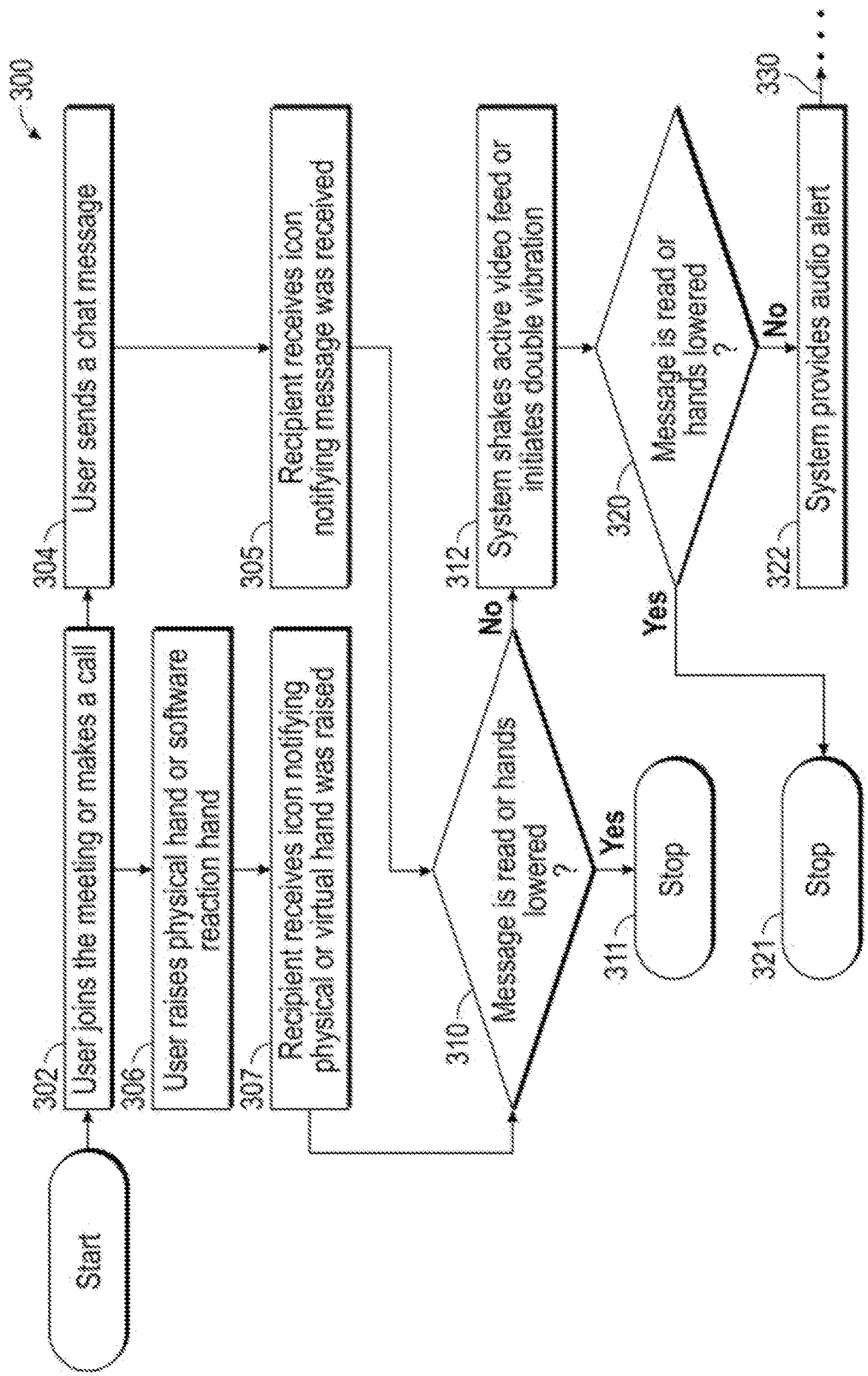
FIG. 3 is a flow chart illustrating one example embodiment of providing for the dynamic presentation of attentional elements within the UI of a participant of a communication session.

FIG. 3 is a flow chart illustrating one example embodiment 300 of providing for the dynamic presentation of attentional elements within the UI of a participant of a communication session.

After the start, at step 302, a user joins a remote meeting or makes a call to attend a remote meeting. In the example, the meeting may be a video meeting, audio meeting, chat-based meeting, or other meeting.

Two different paths are presented with different events that the system receives a signal for. At step 304, the user sends a chat message to another user, which constitutes an event that the system receives a signal for. At step 305, the recipient of the message receives an icon notifying that the message was received, which constitutes a notification. On the alternate path, at step 306, the user can raise a physical hand, or via a UI element, select a "raise hand" or similar button within the presented UI. At step 307, the recipient, i.e., the speaking participant when the user raised his hand, receives an icon notifying him that the user's physical hand or virtual hand was raised.

For any of these events, the next step 310 is a decision point where the system determines whether the intended communication was acknowledged and whether the event has been terminated or not. Particularly, for the chat message, the system determines whether the message was read (i.e., the intended communication was acknowledged), and for the hands being raised, the system determines whether the hands were lowered (i.e., the event has terminated). If the message has been read, at step 311, the system completes the steps and no more action is taken. If the hands have been lowered (either by the physical hand being lowered or the user selecting a "stop raising hand" button), then at step 311, the system also completes the steps and no more action is taken. However, if the message hasn't been read or the hands haven't been lowered, then the system proceeds to step 312.

At step 312, the system initiates an attentional element within the UI or device of the second participant. For example, the system would shake the currently active video feed within the session, or would initiate a double vibration on the client device.

At step 320, the system once again determines whether the intended communication has been acknowledged, and whether the event has been terminated, similarly to step 310. In other words, it again can make a determination as to whether the message has been read or hands have been lowered. If yes for either, then at step 321, the system completes the steps and stops all actions. If the message hasn't been read, or hands haven't been lowered, then at step 322, the system provides an audio alert. This is an additional attentional element which is initiated by the system. This attentional element may be more pronounced than the first attentional element, by virtue of being an audio event, and is of a different modality than the first attentional element (i.e., audio rather than video).

At step 330, the system once again determines whether the intended communication has been acknowledged, and whether the event has been terminated, similarly to step 310. Steps 310-312, steps 320-322, steps 330-332, and so on can be a continuous loop until the event terminates or the indicated communication has been acknowledged.

Figure 4A:
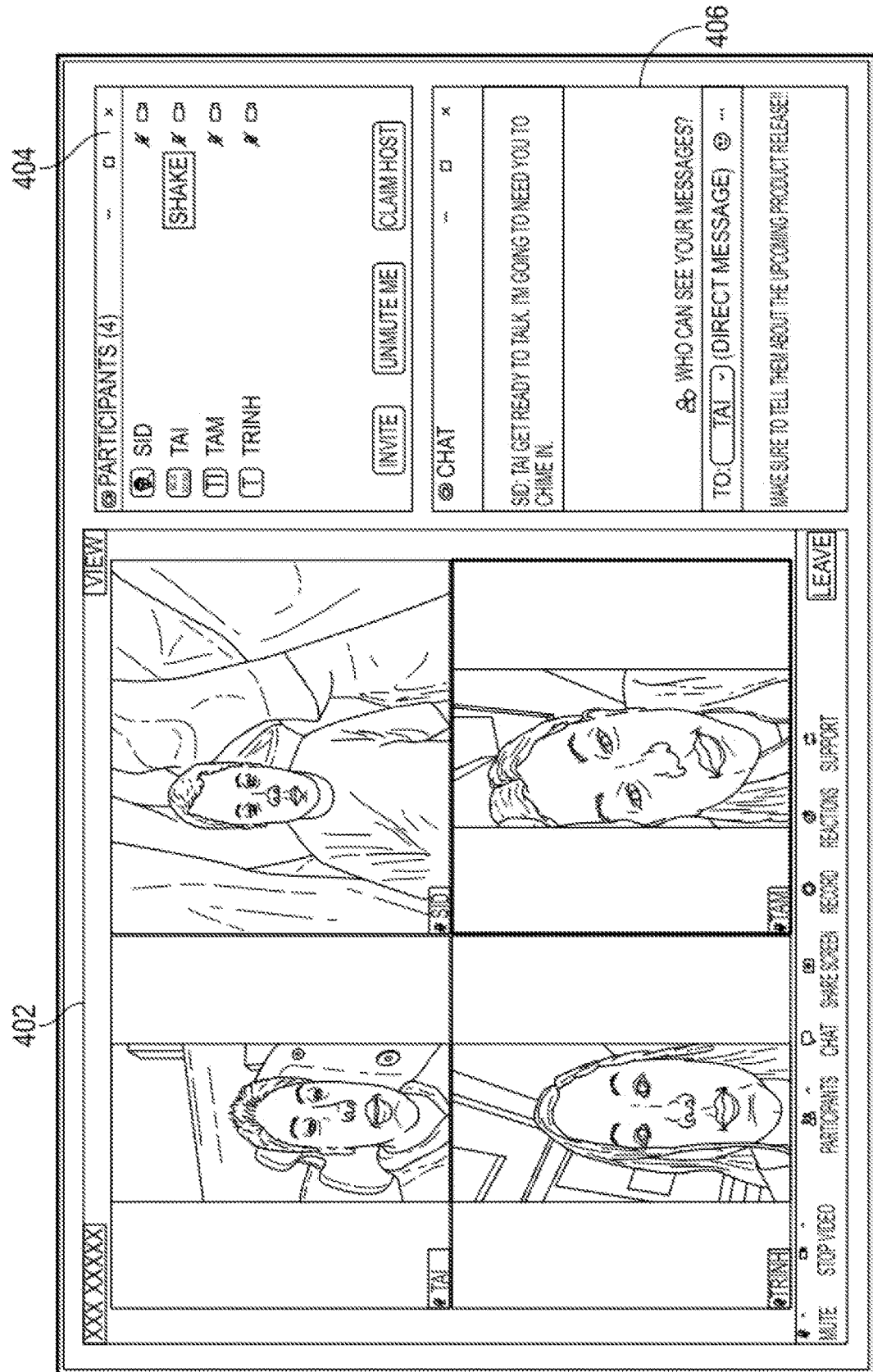
FIG. 4A is a diagram illustrating one example embodiment of a UI for a communication session wherein a first participant is attempting to get the attention of a second participant within a chat window.

FIG. 4A is a diagram illustrating one example embodiment 400 of a UI for a communication session wherein a first participant is attempting to get the attention of a second participant within a chat window.

The illustration depicts a UI that a particular participant is viewing on a screen of the participant's client device. Four participant windows 402 are displayed within the UI in a grid formation. Within each participant window is a video feed. The video feed in each of the participant windows is a live video feed captured via a camera or other device that is either built into or connected to the client device of that participant, then streamed to the UIs of participants. Also appearing in the top right corner of the UI is a participant window 404 with a list of the participants to the session, which represents a list of selectable participants which the first participant can communicate with via a chat message. The participant can choose to click on the name of a participant to open up a chat window for sending a message to that participant. In the bottom right, a chat window 406 has been opened up. The participant viewing the UI has received a direct, private chat message from a first participant, reading, "Get ready to talk. I'm going to need you to chime in."

Figure 4B:
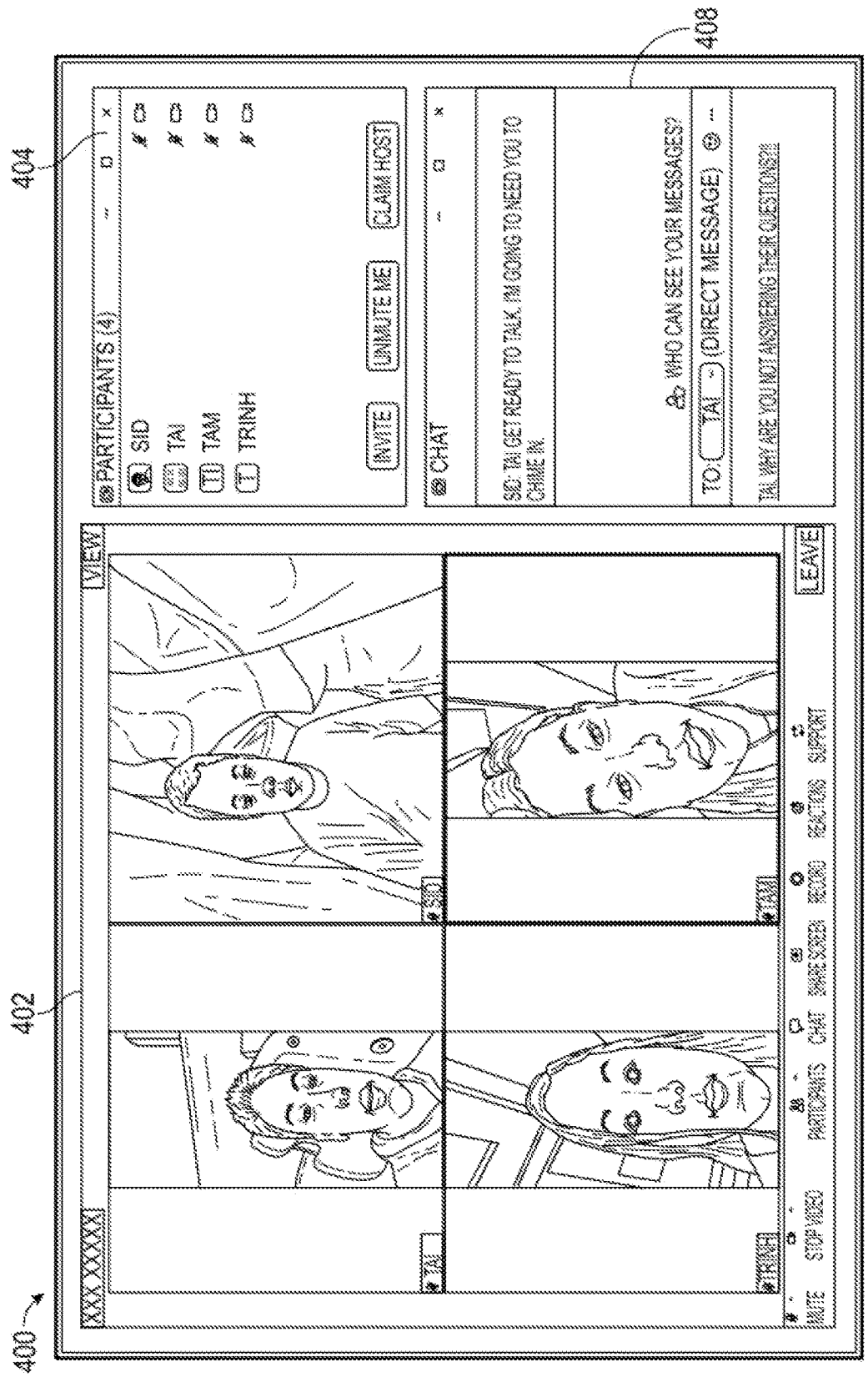
FIG. 4B is a diagram illustrating one example embodiment of a UI for a communication session wherein the first participant is continuing to attempt to get the attention of the second participant.

FIG. 4B is a diagram illustrating one example embodiment of a UI for a communication session wherein the first participant is continuing to attempt to get the attention of the second participant. FIG. 4B is a continuation of the UI and scenario shown in FIG. 4A. After the first participant sent the message to the second participant informing her that she should talk, the second participant did not respond to the message, nor did she talk in the meeting. The first participant sends a follow up message 408 to the second participant that is more urgent, which the second participant receives within the UI.

Figure 4C:
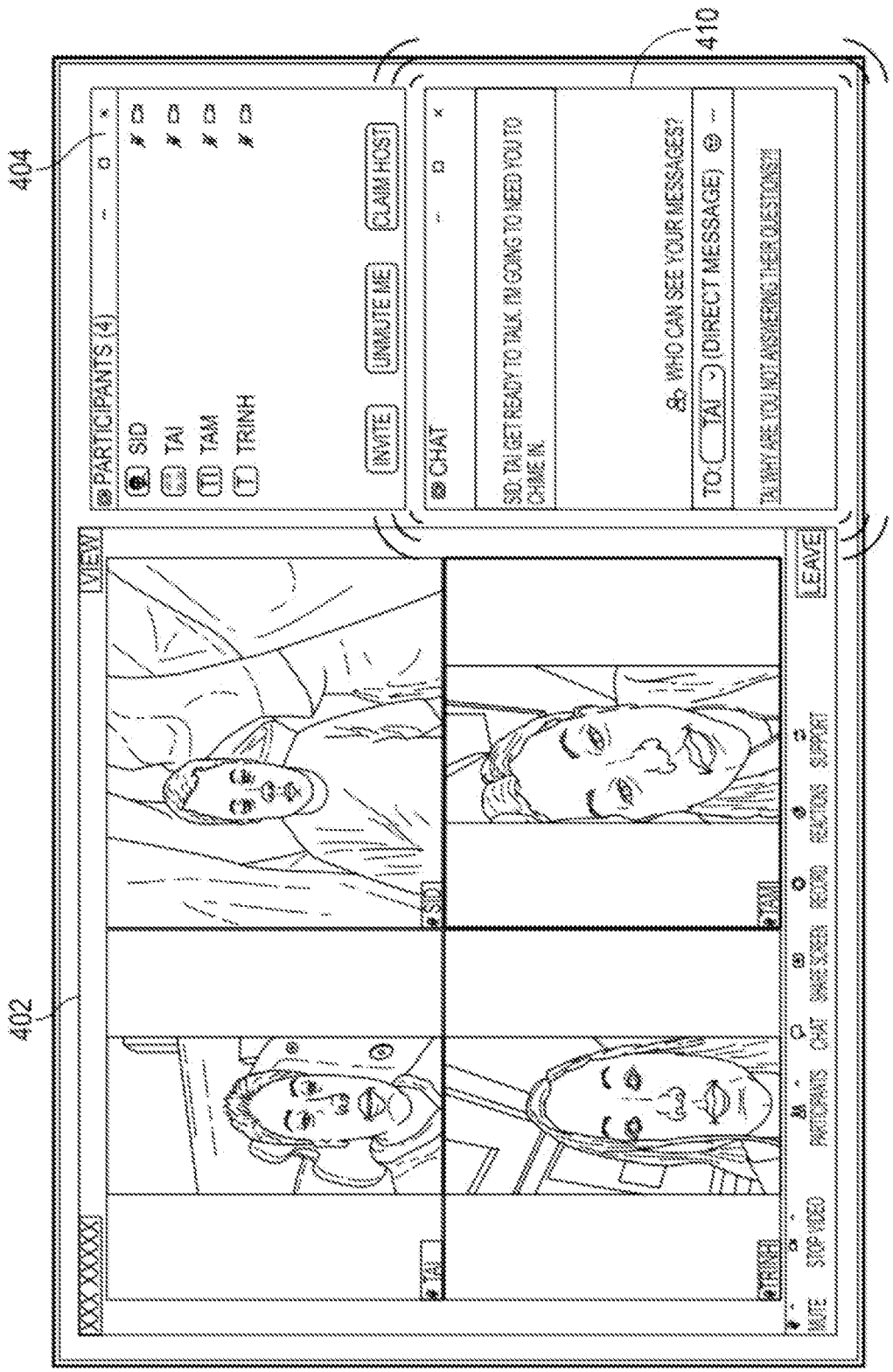
FIG. 4C is a diagram illustrating one example embodiment of a UI for a communication session wherein an attentional element is initiated for the chat window.

FIG. 4C is a diagram illustrating one example embodiment of a UI for a communication session wherein an attentional element is initiated for the chat window. FIG. 4C is a continuation of the UI and scenario shown in FIG. 4A and FIG. 4B. Once more, the second participant has not acknowledged the more urgent message, and still has not started talking in the meeting. At this point, the first participant may select a "Shake" or similar UI button with respect to the second participant, or the system may determine that an attentional element may be required because the participant has not acknowledged the intended communication, and the event has not been terminated (i.e., the urgent situation is still present). The active chat window 410 begins shaking in a pronounced manner, making it clear that there is a message for the participant that requires the participant's attention. The participant notices the shaking, reads the message, and immediately begins speaking in the meeting.

Figure 5:
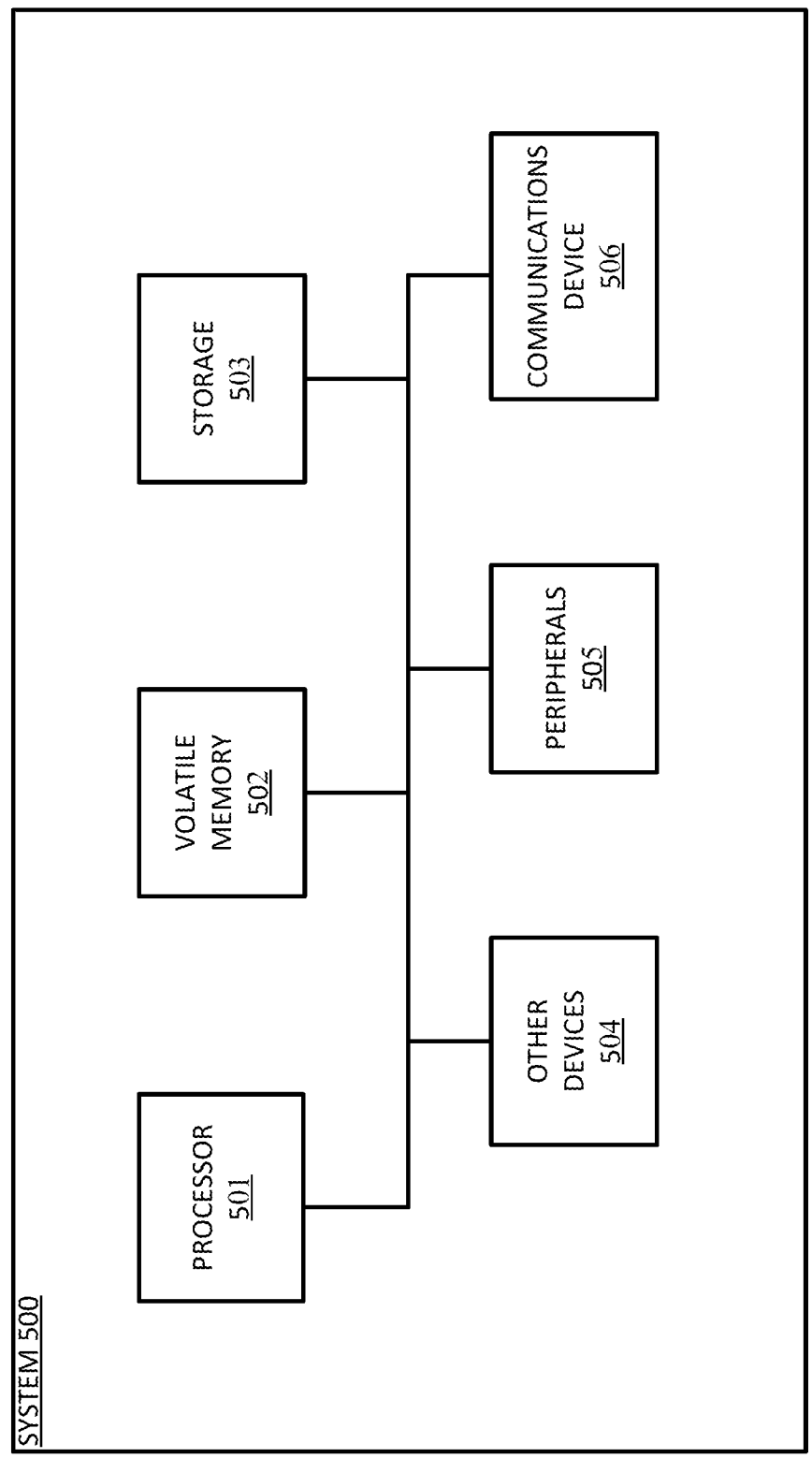
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

It will be appreciated that the present disclosure may include any one and up to all of the following examples.

Example 1. A method comprising: Example 1. A method, comprising presenting, to each of a plurality of participants within a communication session, a user interface (UI) for the communication session; receiving a signal of an event associated with a first participant intending to communicate with a second participant, the second participant not acknowledging the intended communication; determining, after a predefined period of time, that the intended communication from the first participant has not been acknowledged by the second participant and that the event has not yet terminated; and initiating an attentional element within the UI of the second participant.

Example 2. The method of Example 1, further comprising: after initiating the attentional element, determining that the intended communication has still not been acknowledged and that the event has not yet terminated; and initiating an additional attentional element within the UI of the second participant, the additional attentional element being more pronounced or of a different modality than the attentional element.

Example 3. The method of any of Examples 1-2, further comprising: upon receiving the signal of the event, displaying a notification within the UI of the second participant about the event, wherein the predefined period of time passes after the notification is displayed, and wherein the attentional element is more pronounced than the notification.

Example 4. The method of any of Examples 1-3, wherein the event associated with the first participant comprises the first participant physically signaling to the second participant within a video feed associated with the first participant.

Example 5. The method of any of Examples 1-4, wherein the first participant physically signaling to the second participant within the video feed comprises the first participant raising or waving a hand within the video feed associated with the first participant.

Example 6. The method of any of Example 5, wherein determining that the event has not yet terminated comprises determining that the first participant is still raising or waving the hand.

Example 7. The method of any of Examples 1-6, wherein the event associated with the first participant comprises the first participant sending a message to the second participant, the message being accessible by the second participant via the UI during the communication session.

Example 8. The method of any of Examples 1-7, wherein the event associated with the first participant comprises the first participant selecting a UI element indicating a desire to participate in the communication session, and the notification to the second participant comprising a notification UI element informing the second participant about the desire of the first participant to communicate.

Example 9. The method of Example 8, wherein the UI element comprises a virtual hand raise, and the notification to the second participant comprising a notification UI element informing the second participant about the virtual hand raise by the first participant.

Example 10. The method of any of Examples 1-9, wherein the second participant is one or more of: a host or administrator of the communication session, a presenter within the communication session, and a participant with granted permission to receive attentional elements within the communication session.

Example 11. The method of any of Examples 1-10, wherein determining that the intended communication from the first participant has not been acknowledged by the second participant comprises one or more of determining that the second participant has not received the intended communication, has received but not seen the intended communication, or has received and seen but not indicated acknowledgment or provided a response to the first participant.

Example 12. The method of any of Examples 1-11, wherein the attentional element comprises one or more of: a UI element, window, or full screen of the second participant shaking, moving around, changing color, or flickering within the user interface, one or more audio elements being played back to the second participant, one or more tactile or vibration elements being sent to a client device associated with the second participant, and one or more UI elements appearing or being maximized or minimized.

Example 13. The method of any of Examples 1-12, wherein initiating the attentional element comprises: receiving one or more pieces of information about a client device associated with the second participant; generating a list of available attentional elements for the client device based on the one or more pieces of information about the client device; and selecting from the list of attentional elements available for the client device.

Example 14. The method of any of Examples 1-13, further comprising: determining that the first participant and the second participant both belong to the same organization and have an organizational relationship; and determining at least one attentional element to initiate from a list of attentional elements based on the organizational relationship between the first participant and the second participant.

Example 15. The method of any of Examples 1-14, further comprising: determining that the intended communication from the first participant has been acknowledged by the second participant or that the event has terminated; terminating presentation of any notifications and attentional elements with respect to the event; and refraining from further determination or initiation of attentional elements with respect to the event.

Example 16. The method of any of Examples 1-15, further comprising: within a prespecified window of time before or after receiving the event, receiving an additional event associated with a third participant intending to communicate with the second participant; and generating a queue comprising the first participant and the third participant for determining a priority order for initiating attentional elements.

Example 17. The method of any of Examples 1-16, wherein the queue is ordered by one of: first event signal received, and participant with the highest priority ranking with respect to the communication session or the second participant.

Example 18. The method of any of Examples 1-17, further comprising: concurrently to or after receiving the signal of the event, receiving signals of one or more additional events each associated with the first participant intending to communicate with a different additional participant; and for each of the one or more additional events: determining, after a predefined period of time, that the intended communication from the first participant has not been acknowledged by the additional participant associated with the additional event, and that the additional event has not yet terminated, and initiating an additional attentional element within the UI of the additional participant associated with the additional event.

Example 19. A communication system comprising one or more processors configured to perform the operations of: presenting, to each of a plurality of participants within a communication session, a user interface (UI) for the communication session; receiving a signal of an event associated with a first participant intending to communicate with a second participant, the second participant not acknowledging the intended communication; determining, after a predefined period of time, that the intended communication from the first participant has not been acknowledged by the second participant and that the event has not yet terminated; and initiating an attentional element within the UI of the second participant.

Example 20. The communication system of Example 19, wherein the one or more processors are further configured to perform the operations of: within a prespecified window of time before or after receiving the event, receiving an additional event associated with a third participant intending to communicate with the second participant; and generating a queue comprising the first participant and the third participant for determining a priority order for initiating attentional elements.

Example 21. The communication system of any of Examples 19-20, wherein the queue is ordered by one of: first event signal received, and participant with the highest priority ranking with respect to the communication session or the second participant.

Example 22. The communication system of any of Examples 19-21, wherein the one or more processors are further configured to perform the operations of: concurrently to or after receiving the signal of the event, receiving signals of one or more additional events each associated with the first participant intending to communicate with a different additional participant; and for each of the one or more additional events: determining, after a predefined period of time, that the intended communication from the first participant has not been acknowledged by the additional participant associated with the additional event, and that the additional event has not yet terminated, and initiating an additional attentional element within the UI of the additional participant associated with the additional event. Example 23. The communication system of any of Examples 19-22, wherein the one or more processors are further configured to perform the operations of: after initiating the attentional element, determining that the intended communication has still not been acknowledged and that the event has not yet terminated; and initiating an additional attentional element within the UI of the second participant, the additional attentional element being more pronounced or of a different modality than the attentional element.

Example 24. The communication system of any of Examples 19-23, wherein the one or more processors are further configured to perform the operations of: upon receiving the signal of the event, displaying a notification within the UI of the second participant about the event, wherein the predefined period of time passes after the notification is displayed, and wherein the attentional element is more pronounced than the notification.

Example 25. The communication system of any of Examples 19-24, wherein the event associated with the first participant comprises the first participant physically signaling to the second participant within a video feed associated with the first participant.

Example 26. The communication system of any of Examples 19-25, wherein the first participant physically signaling to the second participant within the video feed comprises the first participant raising or waving a hand within the video feed associated with the first participant.

Example 27. The communication system of any of Example 26, wherein determining that the event has not yet terminated comprises determining that the first participant is still raising or waving the hand.

Example 28. The communication system of any of Examples 19-27, wherein the event associated with the first participant comprises the first participant sending a message to the second participant, the message being accessible by the second participant via the UI during the communication session.

Example 29. The communication system of any of Examples 19-28, wherein the event associated with the first participant comprises the first participant selecting a UI element indicating a desire to participate in the communication session, and the notification to the second participant comprising a notification UI element informing the second participant about the desire of the first participant to communicate.

Example 30. The communication system of Example 29, wherein the UI element comprises a virtual hand raise, and the notification to the second participant comprising a notification UI element informing the second participant about the virtual hand raise by the first participant.

Example 31. The communication system of any of Examples 19-30, wherein the second participant is one or more of: a host or administrator of the communication session, a presenter within the communication session, and a participant with granted permission to receive attentional elements within the communication session.

Example 32. The communication system of any of Examples 19-31, wherein determining that the intended communication from the first participant has not been acknowledged by the second participant comprises one or more of determining that the second participant has not received the intended communication, has received but not seen the intended communication, or has received and seen but not indicated acknowledgment or provided a response to the first participant.

Example 33. The communication system of any of Examples 19-32, wherein the attentional element comprises one or more of: a UI element, window, or full screen of the second participant shaking, moving around, changing color, or flickering within the user interface, one or more audio elements being played back to the second participant, one or more tactile or vibration elements being sent to a client device associated with the second participant, and one or more UI elements appearing or being maximized or minimized.

Example 34. The communication system of any of Examples 19-33, wherein initiating the attentional element comprises: receiving one or more pieces of information about a client device associated with the second participant; generating a list of available attentional elements for the client device based on the one or more pieces of information about the client device; and selecting from the list of attentional elements available for the client device.

Example 35. The communication system of any of Examples 19-34, wherein the one or more processors are further configured to perform the operations of: determining that the first participant and the second participant both belong to the same organization and have an organizational relationship; and determining at least one attentional element to initiate from a list of attentional elements based on the organizational relationship between the first participant and the second participant.

Example 36. The communication system of any of Examples 19-35, wherein the one or more processors are further configured to perform the operations of: determining that the intended communication from the first participant has been acknowledged by the second participant or that the event has terminated; terminating presentation of any notifications and attentional elements with respect to the event; and refraining from further determination or initiation of attentional elements with respect to the event.

Example 37. A non-transitory computer-readable medium containing instructions for generating a note with session content from a communication session, comprising: instructions for presenting, to each of a plurality of participants within a communication session, a user interface (UI) for the communication session; instructions for receiving a signal of an event associated with a first participant intending to communicate with a second participant, the second participant not acknowledging the intended communication; instructions for determining, after a predefined period of time, that the intended communication from the first participant has not been acknowledged by the second participant and that the event has not yet terminated; and instructions for initiating an attentional element within the UI of the second participant.

Example 38. The non-transitory computer-readable medium of Example 37, further comprising: within a pre-specified window of time before or after receiving the event, instructions for receiving an additional event associated with a third participant intending to communicate with the second participant; and instructions for generating a queue comprising the first participant and the third participant for determining a priority order for initiating attentional elements.

Example 39. The non-transitory computer-readable medium of any of Examples 37-38, wherein the queue is ordered by one of: first event signal received, and participant with the highest priority ranking with respect to the communication session or the second participant.

Example 40. The non-transitory computer-readable medium of any of Examples 37-39, further comprising: instructions for concurrently to or after receiving the signal of the event, receiving signals of one or more additional events each associated with the first participant intending to communicate with a different additional participant; and for each of the one or more additional events, instructions for: determining, after a predefined period of time, that the intended communication from the first participant has not been acknowledged by the additional participant associated with the additional event, and that the additional event has not yet terminated, and initiating an additional attentional element within the UI of the additional participant associated with the additional event.

Example 41. The non-transitory computer-readable medium of any of Examples 37-40, further comprising: after initiating the attentional element, instructions for determining that the intended communication has still not been acknowledged and that the event has not yet terminated; and instructions for initiating an additional attentional element within the UI of the second participant, the additional attentional element being more pronounced or of a different modality than the attentional element.

Example 42. The non-transitory computer-readable medium of any of Examples 37-41, further comprising: upon receiving the signal of the event, instructions for displaying a notification within the UI of the second participant about the event, wherein the predefined period of time passes after the notification is displayed, and wherein the attentional element is more pronounced than the notification.

Example 43. The non-transitory computer-readable medium of any of Examples 37-42, wherein the event associated with the first participant comprises the first participant physically signaling to the second participant within a video feed associated with the first participant.

Example 44. The non-transitory computer-readable medium of any of Examples 37-43, wherein the first participant physically signaling to the second participant within the video feed comprises the first participant raising or waving a hand within the video feed associated with the first participant.

Example 45. The non-transitory computer-readable medium of any of Example 44, wherein determining that the event has not yet terminated comprises determining that the first participant is still raising or waving the hand.

Example 46. The non-transitory computer-readable medium of any of Examples 37-45, wherein the event associated with the first participant comprises the first participant sending a message to the second participant, the message being accessible by the second participant via the UI during the communication session.

Example 47. The non-transitory computer-readable medium of any of Examples 37-46, wherein the event associated with the first participant comprises the first participant selecting a UI element indicating a desire to participate in the communication session, and the notification to the second participant comprising a notification UI element informing the second participant about the desire of the first participant to communicate.

Example 48. The non-transitory computer-readable medium of Example 47, wherein the UI element comprises a virtual hand raise, and the notification to the second participant comprising a notification UI element informing the second participant about the virtual hand raise by the first participant.

Example 49. The non-transitory computer-readable medium of any of Examples 37-48, wherein the second participant is one or more of: a host or administrator of the communication session, a presenter within the communication session, and a participant with granted permission to receive attentional elements within the communication session.

Example 50. The non-transitory computer-readable medium of any of Examples 37-49, wherein determining that the intended communication from the first participant has not been acknowledged by the second participant comprises one or more of determining that the second participant has not received the intended communication, has received but not seen the intended communication, or has received and seen but not indicated acknowledgment or provided a response to the first participant.

Example 51. The non-transitory computer-readable medium of any of Examples 37-50, wherein the attentional element comprises one or more of: a UI element, window, or full screen of the second participant shaking, moving around, changing color, or flickering within the user interface, one or more audio elements being played back to the second participant, one or more tactile or vibration elements being sent to a client device associated with the second participant, and one or more UI elements appearing or being maximized or minimized.

Example 52. The non-transitory computer-readable medium of any of Examples 37-51, wherein initiating the attentional element comprises: receiving one or more pieces of information about a client device associated with the second participant; generating a list of available attentional elements for the client device based on the one or more pieces of information about the client device; and selecting from the list of attentional elements available for the client device.

Example 53. The non-transitory computer-readable medium of any of Examples 37-52, further comprising: instructions for determining that the first participant and the second participant both belong to the same organization and have an organizational relationship; and instructions for determining at least one attentional element to initiate from a list of attentional elements based on the organizational relationship between the first participant and the second participant.

Example 54. The non-transitory computer-readable medium of any of Examples 37-53, further comprising: instructions for determining that the intended communication from the first participant has been acknowledged by the second participant or that the event has terminated; instructions for terminating presentation of any notifications and attentional elements with respect to the event; and instructions for refraining from further determination or initiation of attentional elements with respect to the event.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising: presenting, to each of a plurality of participants within a communication session, a user interface (UI) for the communication session; receiving a signal of an event associated with a first participant intending to communicate with a second participant, the second participant not acknowledging the intended communication; determining, after a predefined period of time, that the intended communication from the first participant has not been acknowledged by the second participant and that the event has not yet terminated; initiating an attentional element within the UI of the second participant; after initiating the attentional element, determining that the intended communication has still not been acknowledged and that the event has not yet terminated; and initiating an additional attentional element within the UI of the second participant, the additional attentional element being more pronounced or of a different modality than the attentional element, and wherein the additional attentional element comprises one or more of: full screen of the second participant shaking, moving around, changing color, or flickering within the user interface, one or more audio elements being played back to the second participant, one or more tactile or vibration elements being sent to a client device associated with the second participant, and one or more UI elements appearing or being maximized or minimized.

2. The method of claim 1, further comprising: upon receiving the signal of the event, displaying a notification within the UI of the second participant about the event, wherein the predefined period of time passes after the notification is displayed, and wherein the attentional element is more pronounced than the notification.

3. The method of claim 1, wherein the event associated with the first participant comprises the first participant physically signaling to the second participant within a video feed associated with the first participant.

4. The method of claim 3, wherein the first participant physically signaling to the second participant within the video feed comprises the first participant raising or waving a hand within the video feed associated with the first participant.

5. The method of claim 4, wherein determining that the event has not yet terminated comprises determining that the first participant is still raising or waving the hand.

6. The method of claim 1, wherein the event associated with the first participant comprises the first participant sending a message to the second participant, the message being accessible by the second participant via the UI during the communication session.

7. The method of claim 1, wherein the event associated with the first participant comprises the first participant selecting a UI element indicating a desire to participate in the communication session, and the notification to the second participant comprising a notification UI element informing the second participant about the desire of the first participant to communicate.

8. The method of claim 7, wherein the UI element comprises a virtual hand raise, and the notification to the second participant comprising a notification UI element informing the second participant about the virtual hand raise by the first participant.

9. The method of claim 1, wherein the second participant is one or more of: a host or administrator of the communication session, a presenter within the communication session, and a participant with granted permission to receive attentional elements within the communication session.

10. The method of claim 1, wherein determining that the intended communication from the first participant has not been acknowledged by the second participant comprises one or more of determining that the second participant has not received the intended communication, has received but not seen the intended communication, or has received and seen but not indicated acknowledgment or provided a response to the first participant.

11. The method of claim 1, wherein the attentional element comprises one or more of: a UI element, window, or full screen of the second participant shaking, moving around, changing color, or flickering within the user interface, one or more audio elements being played back to the second participant, one or more tactile or vibration elements being sent to a client device associated with the second participant, and one or more UI elements appearing or being maximized or minimized.

12. The method of claim 1, wherein initiating the attentional element comprises:
receiving one or more pieces of information about a client device associated with the second participant; generating a list of available attentional elements for the client device based on the one or more pieces of information about the client device; and selecting from the list of attentional elements available for the client device.

13. The method of claim 1, further comprising: determining that the first participant and the second participant both belong to the same organization and have an organizational relationship; and determining at least one attentional element to initiate from a list of attentional elements based on the organizational relationship between the first participant and the second participant.

14. The method of claim 1, further comprising: determining that the intended communication from the first participant has been acknowledged by the second participant or that the event has terminated; terminating presentation of any notifications and attentional elements with respect to the event; and refraining from further determination or initiation of attentional elements with respect to the event.

15. A communication system comprising one or more processors configured to perform the operations of: presenting, to each of a plurality of participants within a communication session, a user interface (UI) for the communication session; receiving a signal of an event associated with a first participant intending to communicate with a second participant, the second participant not acknowledging the intended communication; determining, after a predefined period of time, that the intended communication from the first participant has not been acknowledged by the second participant and that the event has not yet terminated; initiating an attentional element within the UI of the second participant; after initiating the attentional element, determining that the intended communication has still not been acknowledged and that the event has not yet terminated; and initiating an additional attentional element within the UI of the second participant, the additional attentional element being more pronounced or of a different modality than the attentional element, and wherein the additional attentional element comprises one or more of: full screen of the second participant shaking, moving around, changing color, or flickering within the user interface, one or more audio elements being played back to the second participant, one or more tactile or vibration elements being sent to a client device associated with the second participant, and one or more UI elements appearing or being maximized or minimized.

16. The communication system of claim 15, further comprising: within a prespecified window of time before or after receiving the event, receiving an additional event associated with a third participant intending to communicate with the second participant; and generating a queue comprising the first participant and the third participant for determining a priority order for initiating attentional elements.

17. The communication system of claim 16, wherein the queue is ordered by one of: first event signal received, and participant with the highest priority ranking with respect to the communication session or the second participant.

18. The communication system of claim 15, further comprising: concurrently to or after receiving the signal of the event, receiving signals of one or more additional events each associated with the first participant intending to communicate with a different additional participant; and for each of the one or more additional events: determining, after a predefined period of time, that the intended communication from the first participant has not been acknowledged by the additional participant associated with the additional event, and that the additional event has not yet terminated, and initiating an additional attentional element within the UI of the additional participant associated with the additional event.

19. A non-transitory computer-readable medium containing instructions for generating a note with session content from a communication session, comprising: instructions for presenting, to each of a plurality of participants within a communication session, a user interface (UI) for the communication session; instructions for receiving a signal of an event associated with a first participant intending to communicate with a second participant, the second participant not acknowledging the intended communication; instructions for determining, after a predefined period of time, that the intended communication from the first participant has not been acknowledged by the second participant and that the event has not yet terminated; instructions for initiating an attentional element within the UI of the second participant instructions for, after initiating the attentional element, determining that the intended communication has still not been acknowledged and that the event has not yet terminated; and instructions for initiating an additional attentional element within the UI of the second participant, the additional attentional element being more pronounced or of a different modality than the attentional element, and wherein the additional attentional element comprises one or more of: full screen of the second participant shaking, moving around, changing color, or flickering within the user interface, one or more audio elements being played back to the second participant, one or more tactile or vibration elements being sent to a client device associated with the second participant, and one or more UI elements appearing or being maximized or minimized.

* * * * *